United States Patent [19]
Colgan

[11] Patent Number: 5,828,687
[45] Date of Patent: Oct. 27, 1998

[54] VARIABLE DIMENSION OPTICAL CHAMBER AND LASER INCORPORATING THE SAME

[75] Inventor: Michael J. Colgan, Flanders, N.J.

[73] Assignee: Alimenterics Inc., Morris Plains, N.J.

[21] Appl. No.: 773,026

[22] Filed: Dec. 24, 1996

[51] Int. Cl.⁶ .................................................. H01S 3/08
[52] U.S. Cl. ................................ 372/92; 372/98
[58] Field of Search ........................ 372/92, 98, 33, 372/55

[56] References Cited

U.S. PATENT DOCUMENTS 5,636,238  6/1997  Mohebati et al. ...................... 372/92
5,680,412  10/1997 DeMaria et al. ....................... 372/92

Primary Examiner—Leon Scott, Jr.
Attorney, Agent, or Firm—Lerner, David, Littenberg, Krumholz & Mentlik

[57] ABSTRACT

An optical chamber for use in a laser or other optical device includes a hollow container with holes at opposite ends. A fixed mirror is sealed to the housing and overlies one hole, whereas a movable mirror is sealed to the housing by a flexible seal such as an O-ring interposed between the mirror and the housing. A variable force actuator such as a piezoelectric element biases the movable mirror against the seal. By varying the force applied by the actuator, the movable mirror can be moved towards and away from the fixed mirror to vary the path length through the chamber. The chamber can provide a low cost tunable gas laser.

14 Claims, 1 Drawing Sheet

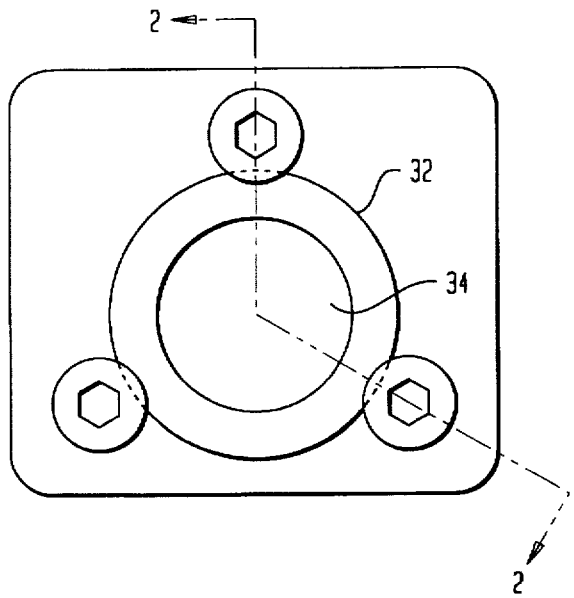
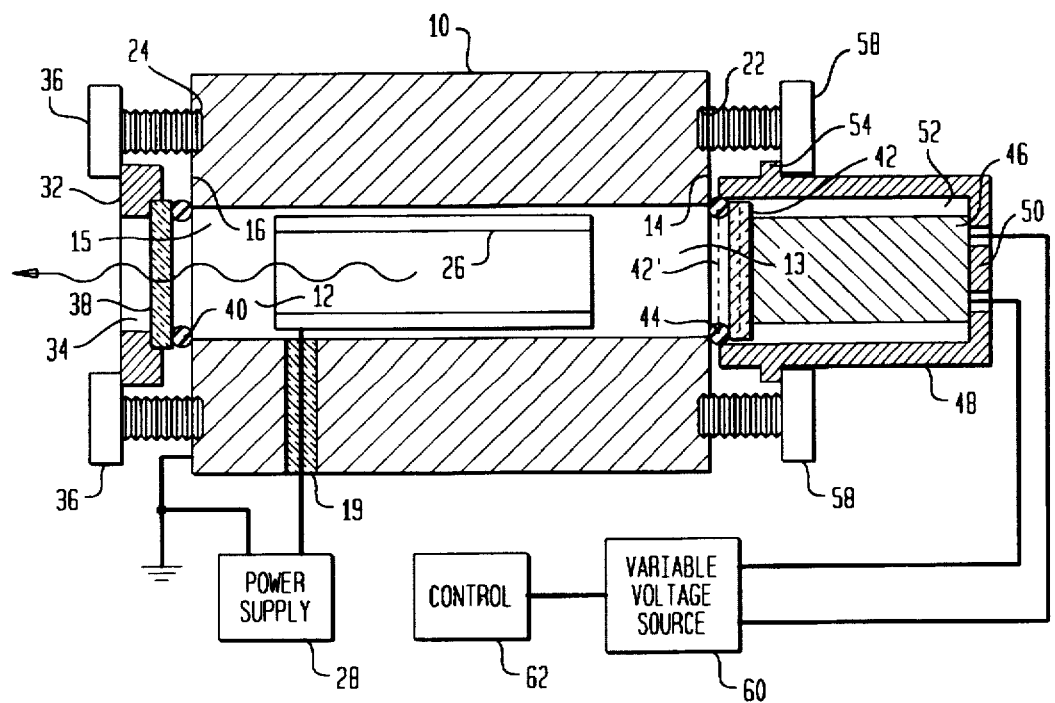

VARIABLE DIMENSION OPTICAL CHAMBER AND LASER INCORPORATING THE SAME

FIELD OF THE INVENTION

The present invention relates to the art of optics, and more particularly relates to chambers such as those used as cavities in gas lasers.

BACKGROUND OF THE INVENTION

Common optical devices such as gas lasers incorporate enclosed chambers for holding a medium such as a gas or plasma and optical elements in optical communication with the interior of the chamber. The optical elements such as lenses, mirrors and windows direct light through the medium contained in the chamber, so that the light can interact with the medium. For example, a simple, economical gas laser includes a tubular housing defining an interior space in the form of an elongated bore, the housing having openings at opposite ends of the bore. A fully reflective mirror is fixed to the housing at one end of the bore, whereas a partially reflective mirror is also fixed to the housing at the opposite end of the bore. The chamber is filled with a suitable lasing gas such as $CO_2$, nitrogen and helium. Electrodes or other devices for applying energy to the gas contained in the chamber are provided for maintaining the gas in an excited state. The gas emits radiation at wavelengths corresponding to transitions between energy states. The light is repeatedly reflected between the mirrors; the reflected light stimulates further light emission coherent with the reflected light. In this manner, the light is amplified by stimulated emission of radiation.

For maximum amplification, the distance between the mirrors should be equal to an integral number of wavelengths of the light. Typically, the excited gas within the chamber can undergo any one of several transitions between states, and can emit light at different wavelengths. One wavelength is well matched to the distance between the mirrors, whereas other wavelengths are not as well matched. The best matched wavelength is strongly amplified whereas the other wavelengths are not. Thus, the light emitted by the laser will consist predominantly of the best-matched wavelength.

The simple and economical laser structure discussed above does not provide for adjustment of the distance between the mirrors. The predominant wavelength is set by conditions established when the housing and mirrors are manufactured as, for example, the length of the tube and the dimensions of the components used to mount the mirrors at the ends of the tube. The predominant wavelength of the laser cannot be adjusted. If the length of the housing changes due to thermal expansion, the distance between the mirrors will change and the predominant wavelength in the light emitted by the laser also will change.

Other laser designs provide precise control of the predominant wavelength in the beam, and the ability to select a particular transition and particular wavelength. Typically, these other designs use a window such as a Brewster window mounted over a hole in one end of the housing, and a mirror, diffraction grating or other optical components mounted outside of this end on an adjustable support. The window seals the opening in the housing and confines the medium in the interior space. The light is repeatedly reflected over a path which extends out of the tube through the window. The external component can be adjusted relative to the tube and relative to the mirror at the opposite end of the housing, so as to vary the path length and thus tune the device to a particular transition and particular wavelength. For example, the mirror and the housing both may be mounted to a larger frame. The external component may be mounted to the frame by way of an adjustable mount.

Although these more complex designs permit control of the path length and thus permit control of the predominant wavelength in the beam, they add, cost, complexity and size to the device. Moreover, the device incorporating external components is more delicate than the device with integrally-mounted mirrors and requires more maintenance. Thus, there has been a need for a chamber design usable in optical devices such as lasers, which would provide the advantages of the complex controllable path length devices discussed above, but which would also provide the advantages of simplicity, ruggedness and low cost associated with the simple chamber designs having fixed mirror mountings.

SUMMARY OF THE INVENTION

The present invention addresses these needs.

One aspect of the present invention provides an optical chamber for use in optical devices such as lasers and other devices where control of path length is desired. A chamber according to this aspect of the invention includes a hollow container having a wall structure enclosing an interior space. The wall structure defines a hole communicating with the interior space. An optical structure including a first optical element is movably mounted to the wall structure at the hole, the first optical element being exposed to the interior space. A resilient sealing element mechanically connects the wall structure and the optical structure so that the optical structure is movable relative to the wall structure and so that the resilient sealing element deforms upon such movement. The resilient sealing element and the optical structure cooperatively seal the hole in the wall structure.

A selectively operable actuator is provided for biasing the optical structure in a first direction relative to the wall structure. Most preferably, the actuator is arranged to bias the optical structure with a selectively adjustable force, so that the optical structure can be moved to any position within a predetermined range of positions by adjusting the force supplied by the actuator. For example, the actuator may include a piezoelectric element. Means such as a variable power supply may be provided for applying a selectively variable voltage to the piezoelectric element, thereby controlling the force applied by the piezoelectric element and controlling the position of the optical structure. The optical structure typically includes a mirror as the optical element. The chamber may further include a second mirror remote from the first mirror and facing the first mirror so as to define a path therebetween. At least a portion of the path, and preferably all of the path, extends within the interior space within the housing. Thus, the wall structure desirably defines a second hole remote from the first hole, and the second mirror overlies the second hole.

Most preferably, the wall structure defines an exterior surface surrounding the first hole and facing outwardly, away from the interior space. The first optical element or mirror overlies this hole and overlies the exterior surface of the wall structure, and the sealing element is disposed between the exterior surface of the wall structure and the optical element. The optical structure may consist solely of the optical element or mirror. The sealing element may be a simple elastomeric seal such as a common "O"-ring. Indeed, the sealing element may be similar to the seals used in those designs where the mirror is fixed to the ends of the housing.

In the common fixed mirror arrangement, the clamping force which holds the mirror against the seal is provided by a fixed element such as a bolted rim. By contrast, in preferred structures according to this aspect of the present invention, the clamping force which engages the mirror with the sealing O-ring is provided by an adjustable device such as a piezoelectric element. This aspect of the present invention incorporates the realization that useful tunability can be accomplished with a small range of motion, and that such small range of motion can be accommodated within the range of compression of a common seal. Preferred structures according to this aspect of the present invention can provide all of the advantages of an adjustable inter-element distance while also providing low cost, compactness and ruggedness commonly attainable only with fixed mountings.

BRIEF DESCRIPTION OF THE DRAWINGS

FIG. 1 is a diagrammatic end view depicting a chamber in accordance with one embodiment of the invention.

FIG. 2 is a diagrammatic sectional view taken along line 2—2 in FIG. 1.

DETAILED DESCRIPTION OF THE PREFERRED EMBODIMENTS

A device in accordance with one embodiment of the invention includes a housing having a wall 10 formed from an elongated aluminum extrusion. Wall structure 10 defines an interior bore or space 12 extending in the lengthwise direction along the housing. The housing defines a first hole 13 at a first end communicating with interior space 12 and a second hole 15, also communicating with the interior space, at the second, opposite end of the housing. Wall structure 10 has a first outwardly facing end surface 14 surrounding hole 13 and a second outwardly facing end surface 16 surrounding hole 15 at the opposite end of the housing.

Housing 10 is provided with a port 19 for evacuating interior space 12 and admitting a medium such as a gas mixture containing carbon dioxide into the interior space. An electrode 26 is mounted within interior bore 12 and is connected electrically to a power supply 28 by a lead extending through port 19, but electrically insulated from wall structure 10 by a dielectric material which fills and seals the port. Port 19 is normally sealed after the interior space has been filled with the medium. Internally threaded bolt holes 22 and 24 are formed in end surfaces 14 and 16 respectively. A further lead connects wall structure 10 to the ground connection of power supply 28, so that the wall structure 10 may serve as a counterelectrode.

An end ring 32 having a central bore 34 is mounted to the second end of the housing by bolts 36 engaged in the bolt holes 24 of the housing. A partially reflective mirror 38 is engaged between end ring 32 and an elastomeric O-ring seal 40. Seal 40 in turn bears on the second end surface 16 of the housing, so that seal 40 mechanically connects the housing wall structure 10 with mirror 38. The foregoing components are of conventional construction. Merely by way of example, these components may be stock components of the type commonly found in a 10 watt $CO_2$ laser sold by Synrad, Inc. of Mukilteo, Wash. U.S.A.

A first end mirror 42 is disposed over the hole 13 at the first end of the housing. A further elastomeric O-ring seal 44 is engaged between mirror 42 and the first end surface 14. Mirror 42 is maintained in engagement with O-ring 44 by a piezoelectric crystal actuator 46. Actuator 46 is received within a generally cup-shaped actuator frame 48. Actuator frame 48 has an end wall or outboard end structure 50 disposed remote from housing 10 and a central bore 52 which receives piezoelectric actuator 46. The actuator frame further has a rim 54 projecting radially from the external circumferential wall of the frame. Bolts 58 engage rim 54 and urge actuator frame 48 inwardly, toward the interior space and toward the first end surface 14, so that the outboard end 50 of the actuator frame bears on actuator 46 which in turn bears on mirror 42. The preload applied through actuator 46 causes seal or O-ring 44 to be partially compressed, even when no voltage is applied to the piezoelectric element.

In one embodiment, actuator 46 may be a piezoelectric actuator of the type sold under the designation AE 0505D16 by ThorLabs, Inc. of Newton, N.J., U.S.A. This actuator is in the form of a rectangular solid about 6.5 by 6.5 by 20 mm, the long dimension being the active direction, i.e., the direction in which the device expands upon application of a voltage. The actuator is mounted so that the active direction extends between mirror 46 and the outboard end 50 of the actuator frame. This device includes numerous piezoelectric ceramic layers that are assembly in a series mechanically (expansion of all layers are additive) and in parallel electrically (so that applied voltage is applied across all layers simultaneously).

Actuator 46 is connected by a pair of leads to a controllable variable voltage power supply. A suitable variable voltage source may include a controller of the type sold under the designation MDT691 and a power supply of the type sold under the designation MDT691-PS, both are variable from ThorLabs, Inc. Source 60 in turn is linked to a control input source 62 arranged to provide control input in a form recognizable by the variable voltage source 60. Where source 60 incorporates the aforementioned controller, control input 62 may be a source of analog control signals. Control input source 62 may be manually adjustable or else may be part of a feedback control system sensitive to the wavelength of light emitted by the laser. For example, in spectroscopic testing equipment, the laser light may be directed through a test sample in a test sample cell and the response of the test sample to the laser light may be monitored. The laser light may also be directed to a control sample cell filled with material of a known composition and response of the known material may be monitored as well. The feedback control system can be arranged to adjust the laser, by adjusting variable voltage source 60, so as to maintain a maximum output from the control sample cell. In an instrument of the type in which the responses of the test sample cell and of the control cell are monitored by a digital computer, the control input source may include an analog output unit such as a common "I/O card" controlled by the digital computer in accordance with the control cell response.

In operation, laser power supply 28 applies excitation voltage between electrode 26 and housing 10, thereby maintaining the gaseous medium disposed in interior bore or space 12 in an excited state. The gas emits light which is repeatedly reflected between first end mirror 42 and second end mirror 38. Some of the light is emitted through mirror 38. Control unit 62 signals voltage source 60 to apply a selected voltage to actuator 46. Actuator 46 in turn applies a biasing force to mirror 42, in addition to the preload discussed above. The added biasing force, in addition to the preload, causes further compression of seal 44 and thus causes mirror 42 to move to the position indicated in broken lines at 42' in FIG. 2. By varying the voltage applied by source 60, the degree of compression of seal 44 can be varied. As the biasing force is reduced, the resilience of seal 44 causes mirror 42 to move back towards its original (zero voltage) position indicated in solid lines. Thus, by adjusting the voltage applied to actuator 46, the system can bring mirror 42 to any position within a preselected range of motion. The range of motion in turn depends upon the characteristics of the actuator and the voltage source, as well as the compressibility of seal 44. With the aforementioned AE0505D16 actuator, a range of motion of about 9 to about 15 microns is achievable.

The excited lasing medium in space 12 has numerous possible transitions between energy states. Under the pressure and temperature prevailing within space 12, the bands of wavelengths associated with the various transitions are broad enough that they overlap and merge into a continuous range of possible emission wavelengths. If the path lengths between mirrors 38 and 42 is equal to a first path length $L_1$, an integral multiple of wavelength $\lambda_1$, light at wavelength $\lambda_1$ will be reinforced strongly by stimulated emission during multiple reflections of light within interior space 12, whereas light at other wavelengths will be less strongly reinforced. If the path length is shifted to another wavelength $L_2$, an integral multiple of wavelength $\lambda_2$, light at wavelength $\lambda_1$ will be less strongly reinforced, but light at $\lambda_2$ will be strongly reinforced. Thus, by varying the voltage applied by source 60 and hence varying the biasing force applied by actuator 46 and the position of mirror 42, the laser can be tuned to a particular wavelength within the range of possible emission wavelengths. This tuning can be maintained by appropriate adjustment of the biasing force to maintain the path length as the dimensions of housing 10 vary due to thermal expansion or physical stress. The entire assembly is simple and rugged. The assembly can be made readily by adapting standard, commercially available laser components.

As will be readily appreciated, numerous variations and combinations of the features discussed above can be utilized without departing from the present invention. The chamber can be used in optical apparatus other than lasers. For example, the chamber can be employed as a gas-filled or evacuated etalon for selecting light at a particular wavelength. Also, optical elements other than mirrors, such as diffraction gratings or prisms, can be mounted and moved in the same fashion. The piezoelectric actuator can be replaced by essentially any other form of mechanical actuator such as a micrometer actuator, magnetostrictive actuator, solenoid, pneumatic actuator or essentially any other device for applying a load. Also, in the embodiments discussed above, the resilient seal 44 is directly interposed between a surface of the optical element or mirror 42 itself and a surface of the wall structure or housing 10. However, in other embodiments, the optical element may be fixed to a mounting or other component, so that the mounting or component moves with the optical element as part of the optical structure. The seal may be interposed between such other element and the housing. Also, the movable optical element can be provided in a chamber which does not have a fixed optical element overlying a hole at the opposite end of the chamber. For example, the movable optical element may be a partially reflective mirror cooperating with a fixed optical element such as a mirror or prism within the chamber to provide an adjustable optical path length.

As these and other variations and combinations of the features discussed above can be utilized without departing from the present invention, the foregoing description of the preferred embodiments should be taken by way of illustration rather than by limitation of the invention as defined in the claims.

What is claimed is:

1. An optical chamber comprising:
   (a) a hollow container having a wall structure enclosing an interior space, said wall structure defining a hole communicating with said interior space;
   (b) an optical structure including a first optical element, said optical structure being movably mounted to said wall structure at said hole;
   (c) a resilient sealing element mechanically connecting said wall structure and said optical structure so that said optical structure is movable relative to said wall structure and so that said resilient sealing element deforms upon such movement, said resilient sealing element and said optical structure cooperatively sealing said hole; and
   (d) a selectively operable actuator for biasing said optical structure in a first direction relative to said wall structure.

2. An optical chamber as claimed in claim 1 wherein said resilient sealing element is connected between said optical element and said wall structure so that the resilient sealing element bears directly on said optical element.

3. An optical chamber as claimed in claim 2 wherein said wall structure defines a surface surrounding said hole and facing outwardly away from said interior space, said optical element overlying said hole and said exterior surface of said wall structure, said sealing element being disposed between said surface and said optical element.

4. An optical chamber as claimed in claim 1 or claim 2 or claim 3 wherein said actuator is mounted to said wall structure.

5. An optical chamber as claimed in claim 4 further comprising an actuator frame mounted to said wall structure and extending outwardly therefrom in alignment with said hole, said frame having an outboard end remote from said wall structure, said actuator being disposed between said outboard end of said frame and said optical structure.

6. An optical chamber as claimed in claim 5 wherein said actuator frame is tubular and defines an actuator bore aligned with said hole, said actuator being disposed in said actuator bore.

7. An optical chamber as claimed in claim 1 wherein said first optical element is a mirror.

8. An optical chamber as claimed in claim 7 wherein said actuator is arranged to bias said optical structure with a selectively adjustable force so that said optical structure can be moved to any position within a predetermined range of positions by adjusting said force.

9. An optical chamber as claimed in claim 8 wherein said actuator includes a piezoelectric element.

10. An optical chamber as claimed in claim 9 further comprising means for applying a selectively variable voltage to said piezoelectric element.

11. An optical chamber as claimed in claim 7 or claim 8 or claim 9 or claim 10 further comprising a second mirror remote from said first mirror and facing said first mirror so as to define a path therebetween, at least a portion of said path extending within said interior space.

12. An optical chamber as claimed in claim 11 wherein said wall structure defines a second hole remote from said first hole, said second mirror overlying said second hole.

13. An optical chamber as claimed in claim 11 wherein at least one of said mirrors is partially reflective.

14. A laser comprising an optical chamber as claimed in claim 13 and means for maintaining a gas within said interior space in an excited state.

* * * * *